(No Model.)
L. C. DAUMAS.
PROCESS OF AND APPARATUS FOR EXTRACTING GOLD FROM ORES.
No. 591,527. Patented Oct. 12, 1897.
10 Sheets—Sheet 1.
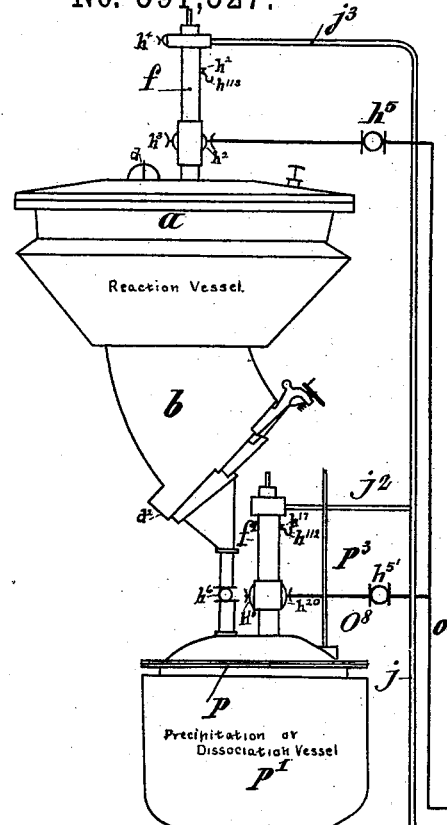
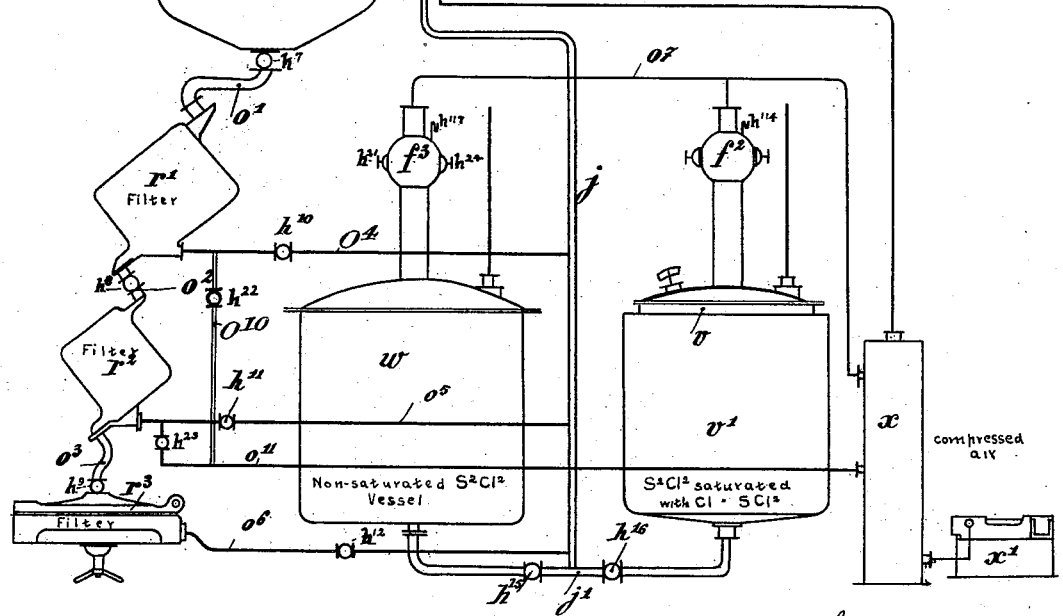
FIG. 1.

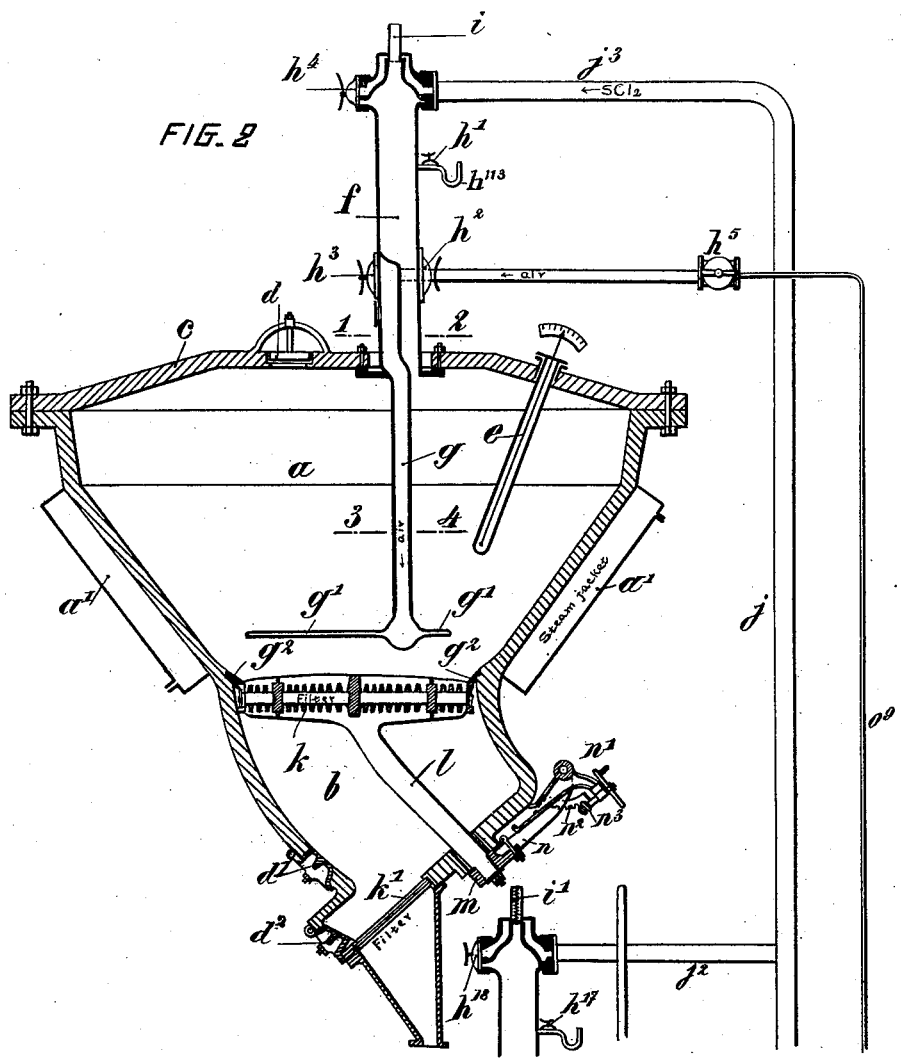

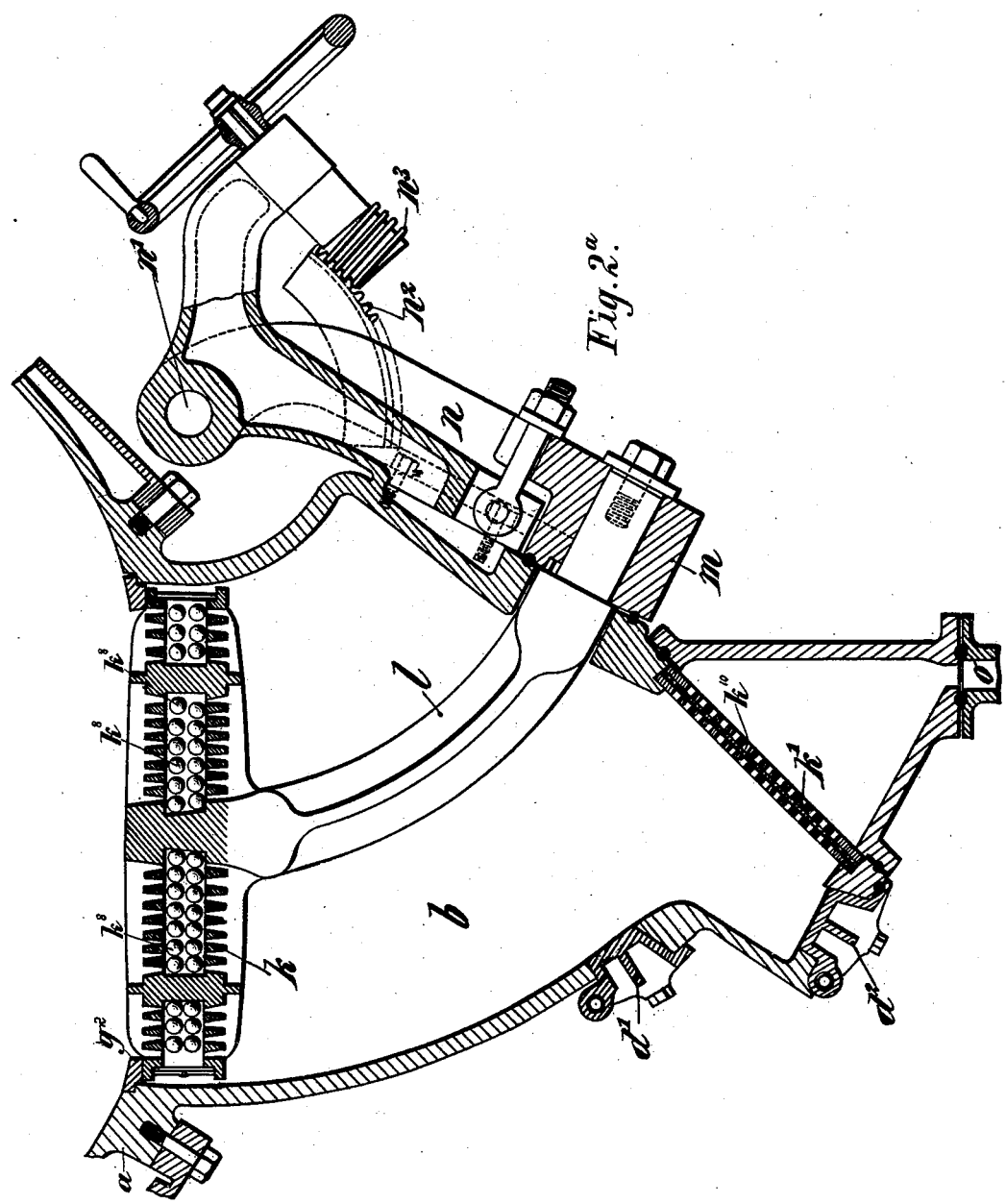

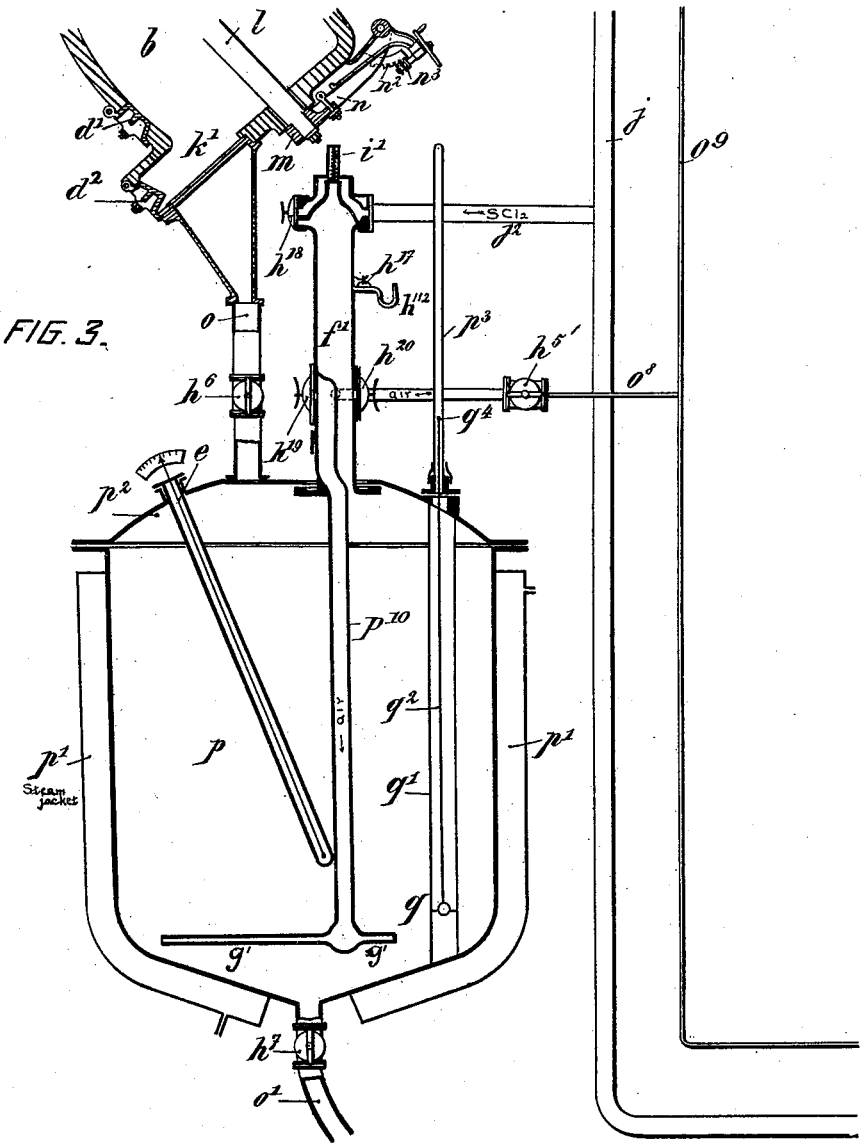

(No Model.) 10 Sheets—Sheet 5.
L. C. DAUMAS.
PROCESS OF AND APPARATUS FOR EXTRACTING GOLD FROM ORES.
No. 591,527. Patented Oct. 12, 1897.
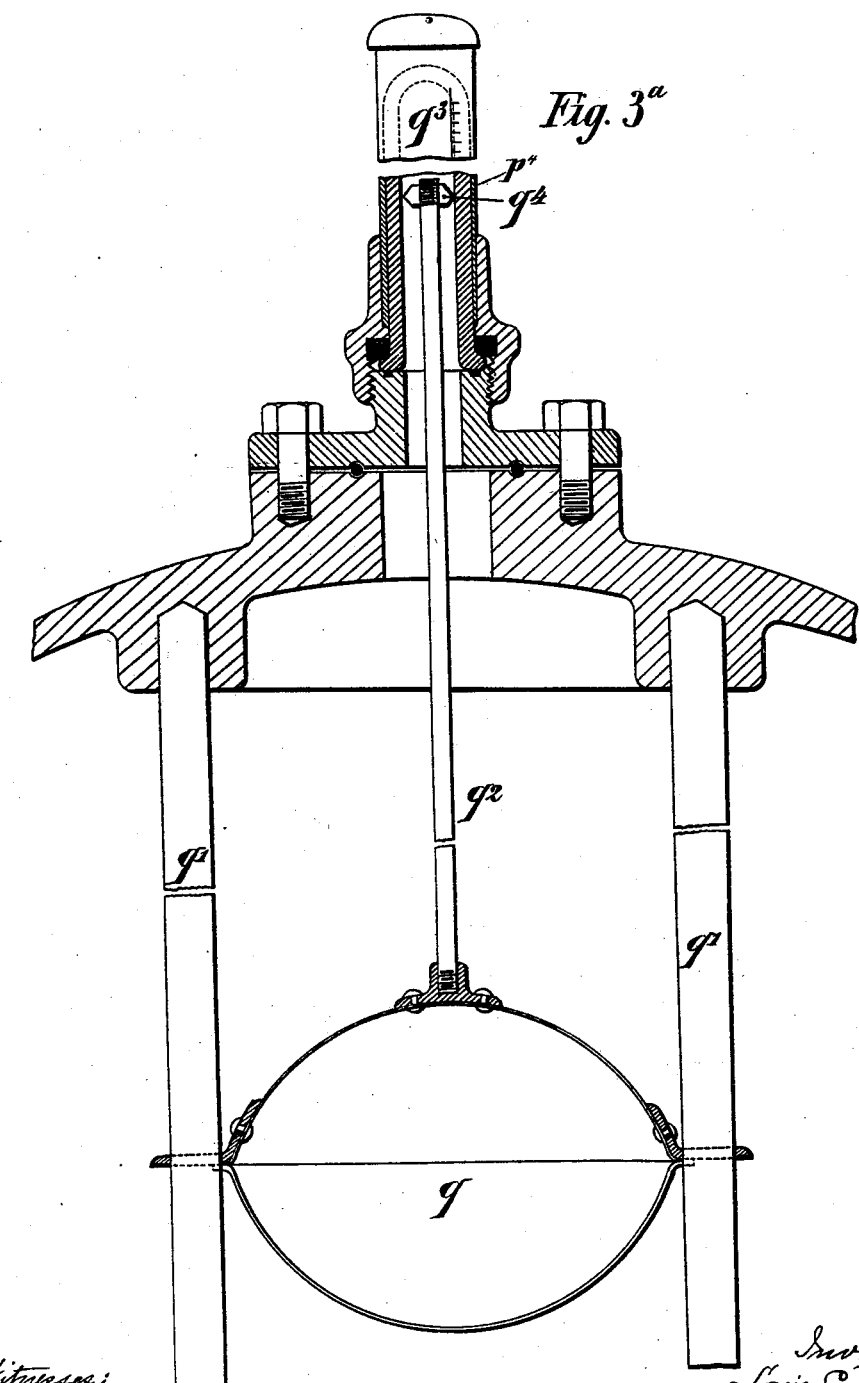

(No Model.) 10 Sheets—Sheet 6.
L. C. DAUMAS.
PROCESS OF AND APPARATUS FOR EXTRACTING GOLD FROM ORES.
No. 591,527. Patented Oct. 12, 1897.
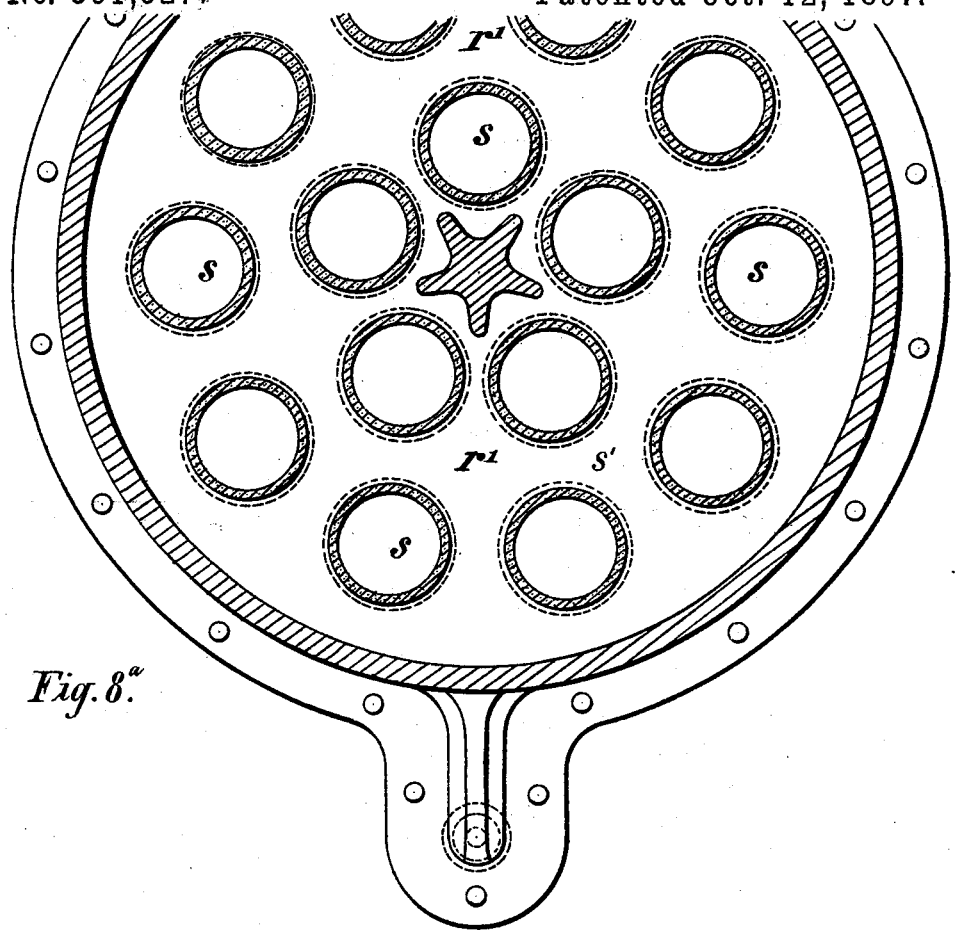
Fig. 8ᵃ.
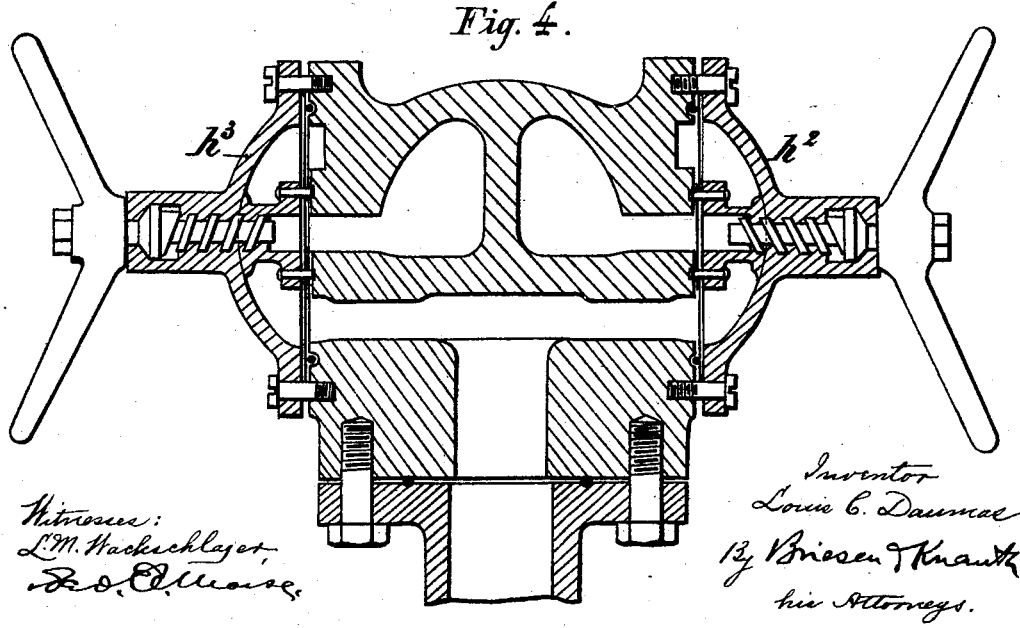
Fig. 4.

(No Model.) 10 Sheets—Sheet 7.
L. C. DAUMAS.
PROCESS OF AND APPARATUS FOR EXTRACTING GOLD FROM ORES.
No. 591,527. Patented Oct. 12, 1897.
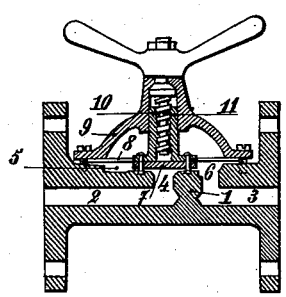
FIG. 10.
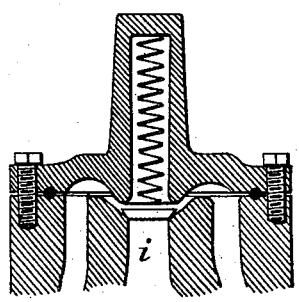
FIG. 5.
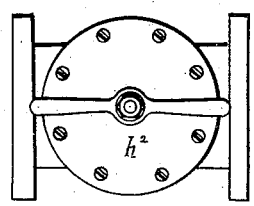
FIG. 11.
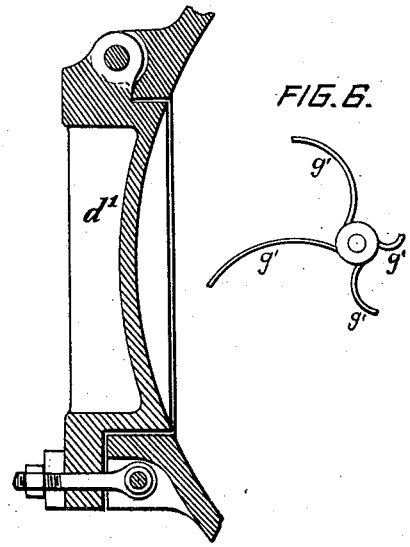
FIG. 7.
FIG. 6.

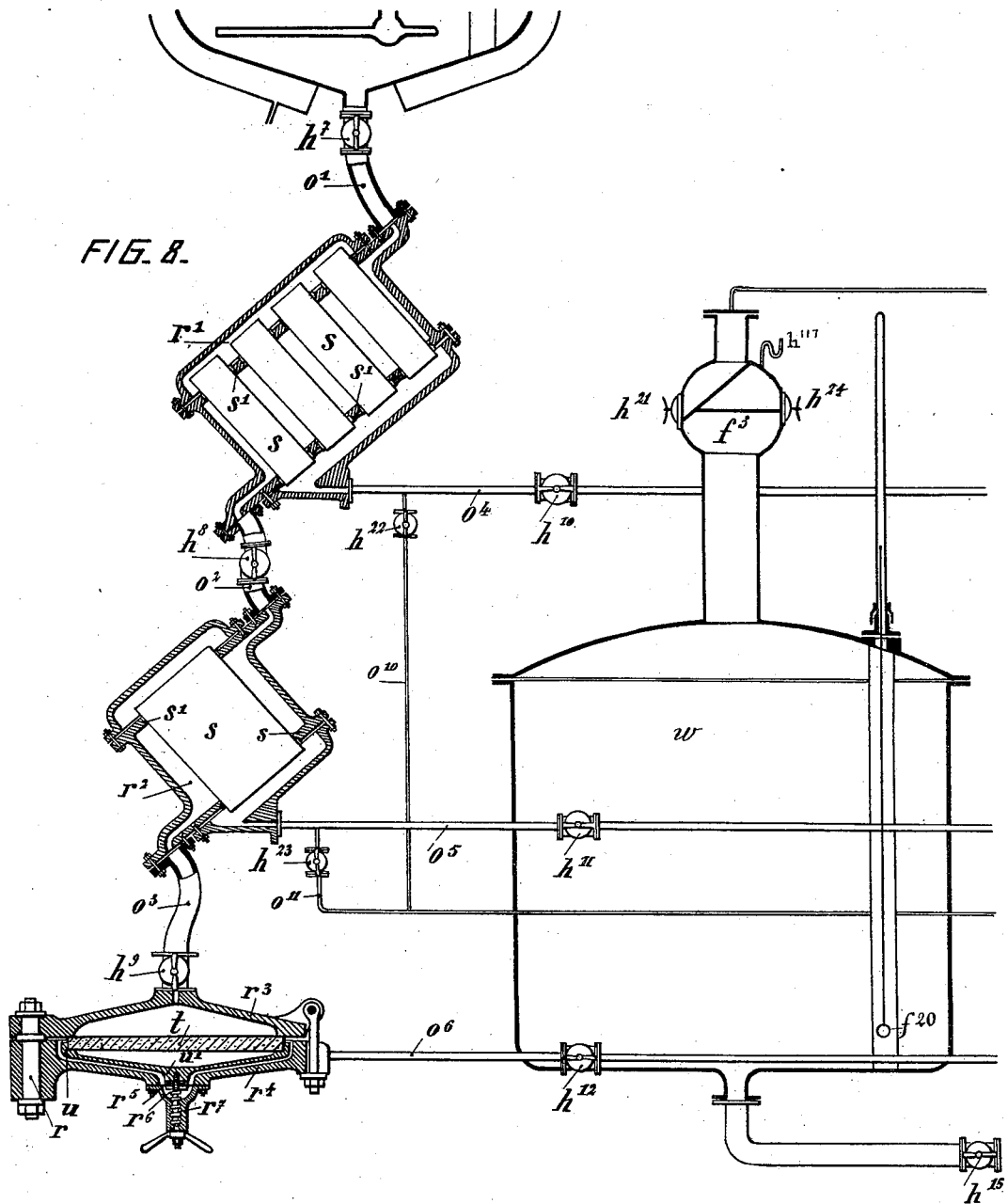

(No Model.) 10 Sheets—Sheet 9.
L. C. DAUMAS.
PROCESS OF AND APPARATUS FOR EXTRACTING GOLD FROM ORES.
No. 591,527. Patented Oct. 12, 1897.
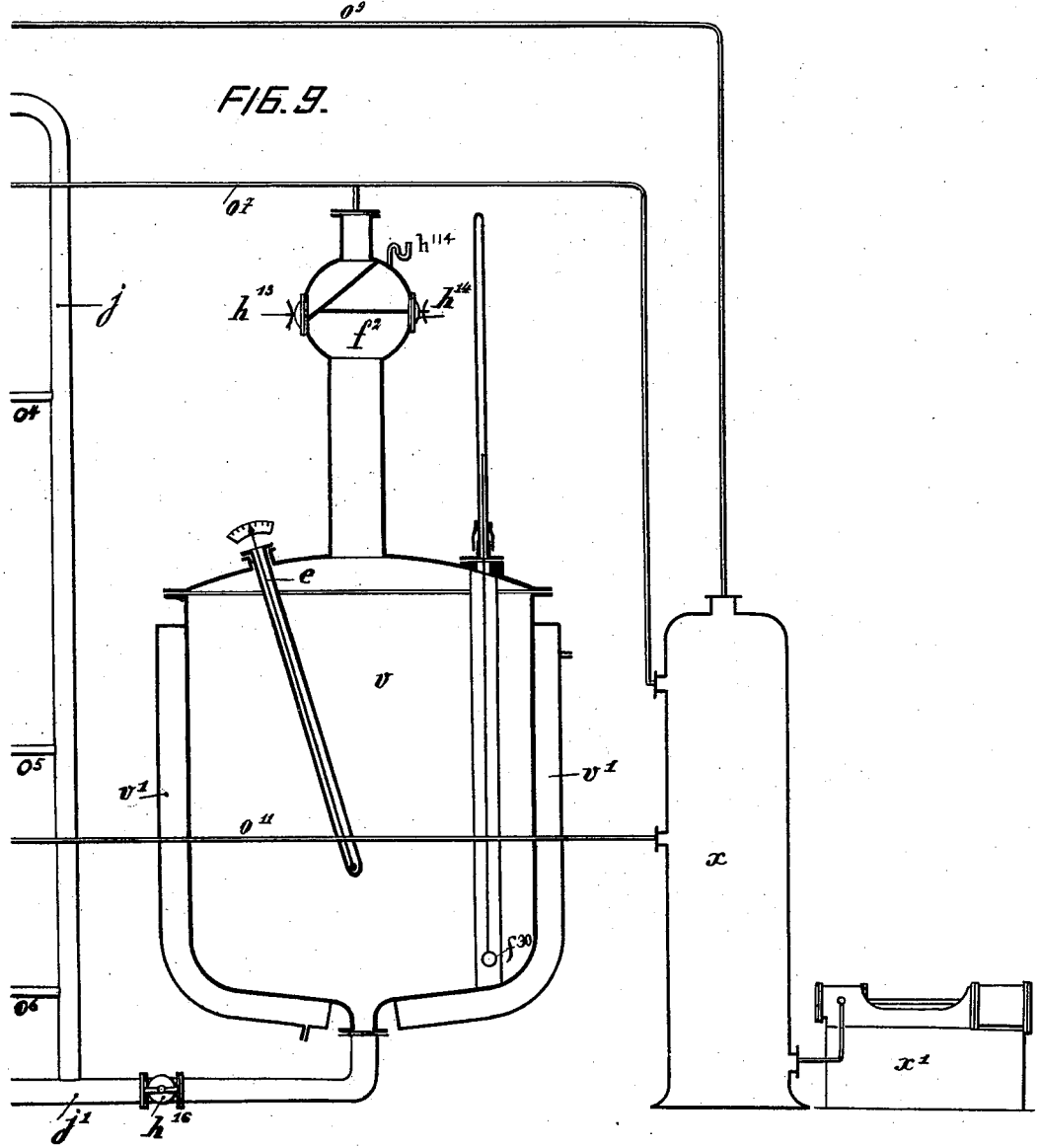

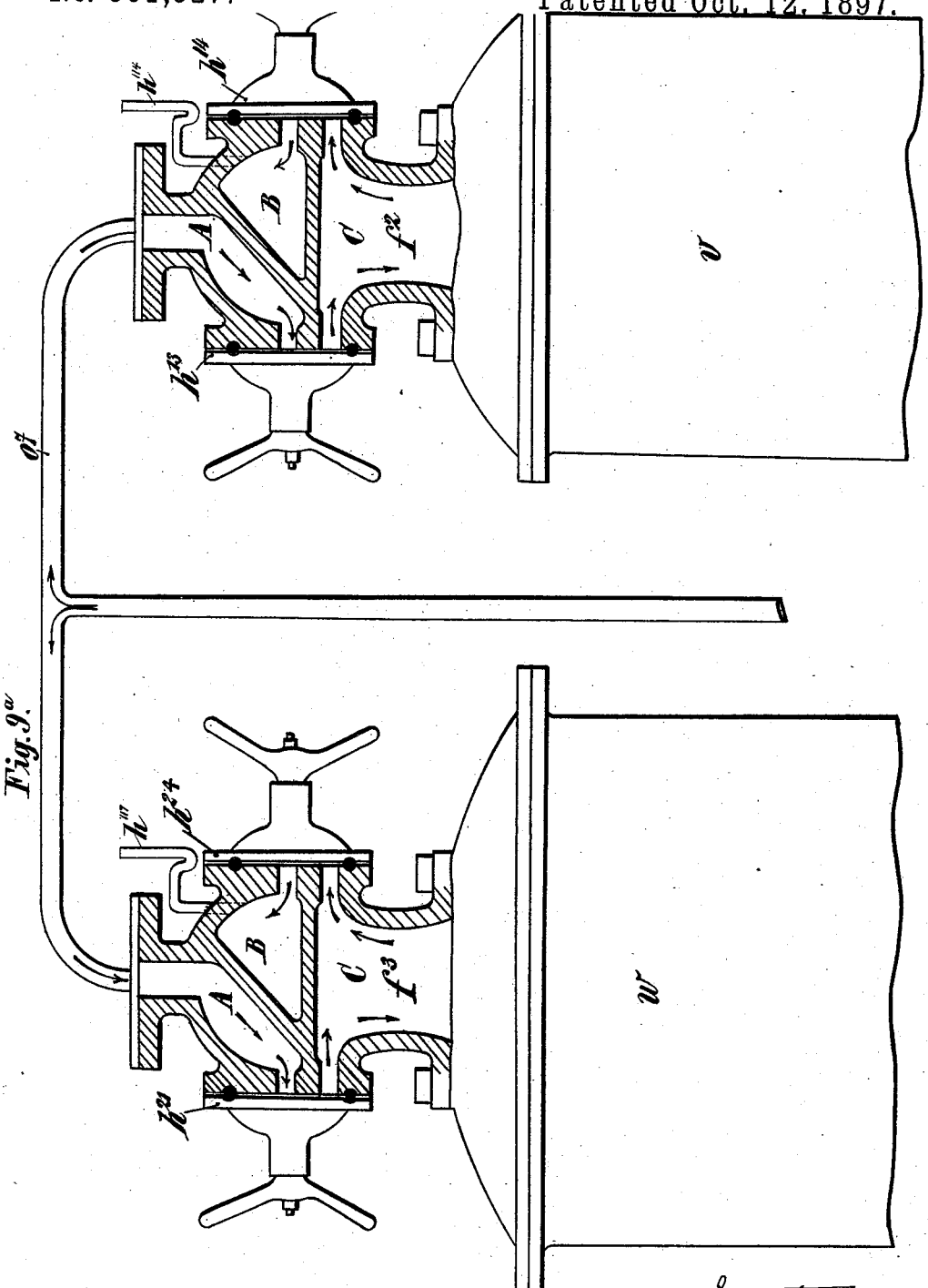

UNITED STATES PATENT OFFICE.

LOUIS CLÉMENT DAUMAS, OF PARIS, FRANCE.

PROCESS OF AND APPARATUS FOR EXTRACTING GOLD FROM ORES.

SPECIFICATION forming part of Letters Patent No. 591,527, dated October 12, 1897.

Application filed February 21, 1896. Serial No. 580,173. (No model.) Patented in France July 26, 1895, No. 249,204.

*To all whom it may concern:*

Be it known that I, LOUIS CLÉMENT DAUMAS, of the city of Paris, France, have invented a Process of and Apparatus for the Extraction of Gold from Ores, (for which I have obtained in France Letters Patent of fifteen years, dated July 26, 1895, No. 249,204,) of which the following is a full, clear, and exact description.

This invention relates to a process for the extraction of gold from its ore, forming the subject of previous Letters Patent of the United States of America, No. 486,698; and it consists in certain improvements in the said process and in apparatus for carrying out the same in practice.

The process described in the said former patent referred to consisted, essentially, in extracting the gold from its ore by heating the latter in presence of dry chlorin and protochlorid of sulfur. The liquid holding the salt of gold in solution after being filtered was cooled, whereby double chlorid of gold and sulfur was thrown down in a solid form, which double chlorid was then separated by a second filtration, slightly moistened with water, and finally decomposed into sulfuric acid and gold in a pulverulent condition. This being understood the following is a description of the improved process forming the subject of the present invention.

The pulverized auriferous ore is mixed with protochlorid of sulfur which has been previously saturated at 80° centigrade with dry chlorin. By heating this mixture the gold is dissolved and forms a double chlorid of gold and sulfur. The liquid holding the gold in solution after filtration instead of being cooled as before is again heated to a temperature of about 138° centigrade for the purpose of dissociating the double chlorid of gold and sulfur by decomposing it into chlorin, which is evolved into chlorid of sulfur, which remains in the liquid, and into gold in a pulverulent condition, which remains in suspension in the liquid. By means of a second filtration the gold in powder is separated from the liquid protochlorid of sulfur and is thus obtained chemically pure and ready to be cast into ingots.

By means of the special arrangements of apparatus hereinafter described I am enabled to recover the whole of the chlorin as well as the whole of the protochlorid of sulfur employed.

My improved process thus consists, essentially, in heating in a container to a temperature of about 130° centigrade a previously-roasted auriferous ore in presence of protochlorid of sulfur previously saturated with chlorin at a temperature higher than 80° centigrade. By this operation a double chlorid of gold and sulfur is formed, while a certain quantity of chlorin is evolved and conducted into a vessel containing protochlorid of sulfur, by which it is absorbed. The protochlorid of sulfur holding the double chlorid of gold and sulfur in solution is filtered in a receiver and subjected to a temperature of about 138° centigrade for the purpose of separating the salt of gold, which becomes completely decomposed, leaving a metallic residue. This operation terminated, the whole of the chlorin which was contained in the protochlorid of sulfur and that which entered into the formation of the auric chlorid has become entirely disengaged, the gas thus set at liberty being conducted into a receiver containing protochlorid of sulfur, by which it is entirely absorbed.

My process enables the whole of the chlorin to be recovered and of thus regenerating the protochlorid of sulfur saturated with chlorin and even recovering the whole of the protochlorid of sulfur employed.

The system of apparatus by the combination and arrangement of which the process of my invention may be carried out in practice comprises, first, a receiver in which the reaction is effected, containing a filtering apparatus; second, a filter; third, a decomposing vessel; fourth, two filters provided with porous-clay cylinders; fifth, a filter provided with a filtering element of porous stone; sixth, a vessel containing protochlorid of sulfur saturated or to be saturated with chlorin; seventh, an absorbing vessel of double the capacity of the last, containing protochlorid of sulfur non-saturated with chlorin.

The series of apparatus is completed by a reservoir of compressed air which has been deprived of all moisture by an air-pump and a superheated steam-generator. The whole of these apparatuses, which are connected by means of pipes provided with suitable cocks, are made of cast-iron and protected from the corrosive action of chlorin by a lining of magnetic oxid, enamel, glass, fire-clay, or other substance or by electroplating with platinum.

Reference is to be had to the accompanying drawings, forming part of this specification, in which—

Figure 1 is an elevation showing in an elementary manner the entire system of apparatus. Fig. 2 is a detail view of the attacking vessel in which the reaction is effected and its accessories. Fig. 2ª is a sectional view of the filter and the lower part of the attacking vessel, on an enlarged scale. Fig. 3 represents part of the filter of the attacking vessel and the decomposing vessel in connection therewith. Fig. 3ª is an enlarged detail sectional view of the float apparatus of the vessel $p$, hereinafter described. Fig. 4 is a horizontal section of the lower end of the cylindrical casing which surmounts the attacking and decomposing vessels, drawn to a larger scale, taken on line 1 2 of Fig. 2. Fig. 5 is a vertical section of the upper end of the said cylindrical casing with its safety-valve. Fig. 6 is a horizontal section on line 3 4 of Fig. 2, which shows the air-inlet pipe. Fig. 7 is a detail sectional view, on an enlarged scale, of a manhole-cover in the side of the attacking vessel shown in Fig. 2. Fig. 8 shows the filtering apparatus provided with cylindrical filtering media and slabs of porous stone and also the vessel containing the protochlorid of sulfur non-saturated with chlorin. Fig. 8ª is a transverse section through the filter $r'$, on an enlarged scale. Fig. 9 shows the vessel containing the protochlorid of sulfur which has passed through the filters and also the compressed-air reservoir. Fig. 9ª is an enlarged sectional view of the heads of vessels $v$ and $w$. Figs. 10 and 11 show, respectively, a section and plan of one of the cocks.

The same letters and numerals of reference denote like parts in all the figures.

The attacking vessel $a$, Fig. 2, in which the reaction is effected, is made funnel-shaped and terminates at its lower part in a bend $b$, so as to bring the bottom of the vessel slightly toward one side. The vessel is closed at top by a cover $c$, provided with three openings, one serving for the introduction of the ore, being closed by a cover $d$, a second for the insertion of the casing $e$ of a thermometer having a dial or other index-scale, while to the remaining opening is applied a cylindrical head $f$, furnished interiorly with a pipe $g$, closed at its upper end, which passes down within the vessel $a$ and terminates in curved branches $g'$ of varying length, as shown in plan in Fig. 6.

The upper end of pipe $g$ is in communication with one of the openings made in the side of head $f$, which is provided with four cocks $h'$ $h^2$ $h^3$ $h^4$. The cock $h'$ serves to put the interior of vessel $a$ in communication with the external air through a ∪-shaped pipe $h^{113}$, containing chlorid of calcium. Cock $h^2$ serves to connect the vessel with the reservoir of compressed air. Cock $h^3$ serves to establish communication between the interior of pipe $g$ and said reservoir, and cock $h^4$ serves to connect the interior of vessel $a$ with the receiver containing protochlorid of sulfur saturated with chlorin. The head $f$ is also provided at its top with a safety-valve $i$, Fig. 5, to allow gases or air to escape through pipe $j$ into the vessel containing protochlorid of sulfur saturated with chlorin. Cock $h^5$ serves to prevent the passage of the chlorin into the compressed-air reservoir when cocks $h^2$ $h^3$ are opened during the chlorination of the ore. The vessel $a$ is inclosed in a steam-jacket $a'$. Seated in the vessel $a$ is a cast-iron ring $g^2$, against the under face of which is seated the upper plate of the filter $k$, which comprises two circular plates which may be in the form of grids, as shown, connected together by studs and surrounded by a strip of platinized steel, the space between the plates being suitably filled with glass balls $k^8$. The lower plate has a bent stem $l$, the lower end of which is bolted to a plate $m$, forming a cover, closing the orifice in the inclined bottom of vessel $a$, through which said stem projects. This cover $m$, which is secured by means of hinged bolts, is carried by an arm $n$, moving on a pivot $n'$ and provided with a worm-wheel segment $n^2$, with which gears a worm $n^3$, operated by a hand-wheel, the object being to guide the stem $l$ during the descent of the filter.

The vessel $a$ also has two openings for the exit of the ore, closed, respectively, by covers $d'$ $d^2$, Fig. 7. One outlet may, however, be sufficient. At the lower part of the vessel is a filter consisting of a conical casing open at each end and provided interiorly with two inclined perforated plates $k'$, inclosing a layer of slag wool $k^{10}$. This filter is connected by a pipe $o$ with the vessel $p$ through a cock $h^6$. (See Fig. 3.) The vessel $p$ is cylindrical and inclosed by a steam-jacket $p'$, with steam inlet and outlet. The vessel is closed by a cover $p^2$, to which pipe $o$ is connected, and with openings for inserting a thermometer $e$ and float $q$ for the attachment of the head $f'$, similar to that of the reacting vessel $a$, having an air-pipe $p^{10}$ similar to the air-pipe $g$ of the attacking vessel $a$, and performing a similar function. The float $q$ (see Fig. 3ª) slides in guides $q'$ and has a rod $q^2$, which moves up and down within a glass tube $q^3$ over the graduations on an apertured copper tube $p^3$, through which the movement of the pointer $q^4$ upon rod $q^2$ may be seen. The vessel $p$ is shown as communicating with the external air by means of the safety-valve $i'$ on the head $f'$.

The vessel $p$ is connected with the filtering apparatus $r'$ $r^2$ by a branch pipe $o'$, provided with a cock $h^7$. These filters (see Fig. 8) differ only in the number of porous-clay cylinders $s$ which they contain. The filter $r'$, situated immediately beneath the vessel $p$, would contain, for example, eight or more hollow cylinders, while the filter $r^2$ contains but one cylinder; but the number of cylinders in $r'$ may be increased, as also the number of filters, with a view to expedite the operation. The last filter of the series would, however, in all cases contain but a single cylinder. The filters, which are placed at an angle of about forty-five degrees, are each formed of a cylindrical cast-iron, provided with division-plates $s'$, apertured to receive the porous elements, which are fixed therein hermetically by lead joints, the end covers being secured to the casing by flanged joints. There are thus two distinct compartments, the one around the hollow filtering-cylinder between plates $s'$, through which compartment the liquid flows, and the other compartment communicating with the interior of the said filtering-cylinders. The pipe $o'$ connects with the former of these compartments in filter $r'$, and the several filters are connected together by pipes $o^2$ $o^3$ under the control of cocks $h^8$ $h^9$. The pipe $o^3$ connects with a filter of different construction, represented in Fig. 8 and formed of two concave covers $r^3$ $r^4$, pivoted about a stud $r$ and clamped together by hinged bolts. The upper cover $r^3$ has an internal shoulder, against which a disk $t$, of porous stone, is clamped by arms $u$, projecting from a boss $u'$, which passes through a diaphragm of platinized steel $r^5$, closing the aperture of the lower cover $r^4$. The boss $u'$ has a threaded socket $r^6$ to receive a thrust-screw $r^7$.

From the several filters pipes $o^4$ $o^5$ $o^6$, respectively controlled by cocks $h^{10}$ $h^{11}$ $h^{12}$, connect to pipe $j$, leading to the lower part of the vessel containing the non-saturated protochlorid of sulfur for conducting the filtrates thereto. The pipe $j$ connects by pipes $j^2$ $j^3$ with the heads $f$ $f'$ of the vessels $a$ and $p$ and by pipe $j'$ with the bottom of the vessel $v$, Fig. 9, containing the protochlorid of sulfur saturated with chlorin. This vessel $v$ may be surrounded with a steam-jacket $v'$ for heating the same. The cover of vessel $v$ is apertured to receive a thermometer $e$ and for the passage of the rod of the float $f^{20}$ and for the attachment of a head $f^2$, fitted with two valves $h^{13}$ $h^{14}$ (see Fig. 9$^a$) and a U-shaped air-tube $h^{114}$, containing chlorid of calcium. The heads $f^2$ and $f^3$ of vessels $v$ and $w$ are chambered, so as to form three compartments A B C in each. (See Fig. 9$^a$.) The chamber A communicates at top with a pipe $o^7$, leading to the compressed-air reservoir and at the bottom when valve $h^{21}$ or valve $h^{13}$ is open with chamber C, which is in turn in free communication with the vessel $v$ or $w$, the one or the other of which can thus be connected with the compressed-air reservoir by opening valve $h^{21}$ or $h^{13}$.

The chamber B communicates with the exterior air by means of the U-shaped pipe $h^{117}$, and when valve $h^{21}$ or $h^{14}$ is open it also communicates with chamber C and consequently with the vessel. It is thus easily seen that the vessel $v$ or $w$ may be put in communication with the exterior air when valve $h^{24}$ or $h^{14}$ is opened. The pipe $j'$ is also connected with the bottom of vessel $w$, Fig. 8, containing the non-saturated photochlorid of sulfur, the communication with the two vessels being controlled by valves $h^{15}$ $h^{16}$, so that the vessel $w$, which is about double the capacity of vessel $v$, may be placed in communication either with the filters or with vessel $v$.

The vessel $w$ is also surmounted by a head $f^3$, (see Fig. 9$^a$,) having valves $h^{21}$ and an air-tube $h^{117}$ containing chlorid of calcium for establishing communication either with the compressed-air reservoir or with the external air, and is provided with a float $f^{30}$, the floats of both $w$ and $v$ being similar to that of vessel $p$. The compressed-air reservoir $x$, charged by the air-pump $x'$, is connected with the heads $f^2$ $f^3$ of vessels $v$ and $w$ by pipe $o^7$, with vessels $p$ and $a$ by pipes $o^8$ and $o^9$, and with the filters $r'$ $r^2$ by the pipes $o^{10}$ and $o^{11}$, respectively controlled by valves.

The special form of screw-down valve employed is shown in Figs. 10 and 11, and consists of a disk valve 7, closing against an annular seat 1 around a central orifice 4, leading to passage 2, the seat being surrounded by an annular groove 5, into which passage 3 opens by orifice 6. The valve 7 is carried by a diaphragm 8, of platinized steel, clamped by its edges upon the valve-body by a cap 9, in which is mounted a screw 10, which works in a screw-socket 11, attached to diaphragm 8 and valve 7.

The general operation of the apparatus is as follows: The vessel $v$ being filled with protochlorid saturated with chlorin and vessel $w$ with non-saturated protochlorid the covers $d'$ $d^2$ of vessel $a$ are closed and also the valve $h^6$ of the filter, the pulverized and roasted ore introduced and the cover $d$ closed and valve $h'$ opened, as well as that for establishing communication with the vessel containing protochlorid of sulfur saturated with chlorin. In connecting this vessel with the compressed-air reservoir by opening valve $h^{13}$ the liquid saturated with chlorin is forced into the reaction vessel $a$ after having opened valves $h^{16}$ and $h^4$. When the float shows that the whole of the liquid has passed into said vessel, an equivalent quantity of protochlorid of sulfur is admitted into the vessel which has just been emptied by opening valve $h^{15}$, and when the floats show that this has been done the valve $h^{15}$ is closed and the valves $h^3$ and $h^5$ are opened to admit compressed air through the dip-pipe $g$, so as to impart a circular movement to the mass. After a few minutes the compressed air is shut off, valves $h^3$, $h'$, and $h^5$ being closed. A current of steam is introduced into the jacket $a'$ of vessel $a$, and when the thermometer shows that the temperature has attained 130° centigrade the valve $h^4$ is opened and the chlorin in excess discharged into the vessel $v$, (the valve $h^{16}$ being left open,) where it is absorbed by the protochlorid of sulfur.

When the float indicates that the absorption of chlorin ceases to raise the level of the liquid in said vessel, the valve $h^4$ is closed, valve $h^6$ is opened, and afterward the valves $h^2, h^3$, and $h^5$ are opened to admit compressed air, whereupon all the liquid contained in vessel $a$ passes into the vessel $p$, during which operation valve $h^{17}$ remains open.

When the float shows that all the liquid holding gold in solution has filtered into the vessel $p$, the valve $h^{17}$ is closed and a current of superheated steam is circulated in the jacket $p'$, in order to raise the solution to the temperature at which the dissociation of the double chlorid of gold and of sulfur is effected— viz., 138° centigrade. On this result being attained the valve $h^{18}$ is opened to allow all the chlorin liberated at this temperature to escape (the valve $h^{16}$ always remaining open) and pass into the vessel $p$, where it is absorbed by the protochlorid of sulfur, which has been already partially saturated with chlorin. This done, the valve $h^{18}$ is closed and valves $h^{19}\ h^{20}\ h^7\ h^{15}\ h^{10}\ h^5$ are opened to allow the compressed air to force the liquid into the first filter $r'$ and the greater part after having traversed the porous-stone tubes arrives in vessel $w$. When the liquid has traversed the porous-clay cylinders of filter $r'$ and has arrived in vessel $w$, the valve $h^{17}$ in the cover of vessel P is then opened, and through this valve and the U-shaped pipe $h^{112}$ the compressed air contained in vessel P and filter $r'$ escapes into the atmosphere. The valve $h^{21}$ in the head of vessel $w$ is then opened, when the air compressed to three atmospheres enters vessel $w$, drives back the liquid contained in said vessel through the pipes $j', j$, and $o^4$, (valves $h^{15}\ h^{10}$ being opened) and thus arrives in filter $r'$, which it fills, as there is no pressure in said filter to counterbalance the pressure of three atmospheres, at which the liquid enters said filter, inasmuch as this will have been previously emptied through the valve $h^{17}$ and U-shaped air-tube $h^{112}$. When filter $r'$ is filled with liquid, (which is shown by the sinking of the float in vessel $w$,) valves $h^{10}$ and $h^7$ are closed and the valve $h^{24}$ on the head of vessel $w$ opened to allow the compressed air contained in said vessel to escape into the atmosphere through the air-tube $h^{117}$. In order to force the liquid in filter $r'$ into filter $r^2$, valve $h^8$ is opened, when on opening valve $h^{22}$ the compressed air, arriving by pipe $o^{10}$, exerts a pressure of three atmospheres upon the liquid contained in filter $r'$, forces the liquid downward into the filter $r^2$ and back into the vessel $w$, through the pipes $o^5, j$, and $j'$, the valves $h^{11}$ and $h^{15}$ having been previously opened. As the vessel $w$ has been already, as before stated, emptied of the compressed air it contained by opening valve $h^{24}$ to allow the air to escape through the air-tube $h^{117}$, there is thus no pressure to counterbalance the pressure of three atmospheres with which the liquid is forced into vessel $w$.

If preferred, another method of forcing the liquid from filter $r'$ into filter $r^2$ and thence into vessel $w$ may be adopted, which consists in admitting compressed air (valve $h^5$ being open,) through the valve $h^{20}$ in the head of vessel P, which is opened, the valves $h^7\ h^8\ h^{11}\ h^{15}$ having been previously opened and valve $h^{10}$ closed, when the compressed air entering vessel P forces the liquid which fills filter $r'$ into filter $r^2$ and thence through the pipes $o^5, j$, and $j'$ into vessel $w$, which, as it is needless to remark, has been previously emptied of compressed air by opening the valve $h^{24}$. The gold in powder which had remained upon the external surface of the filter-tubes is carried by the return-current thus produced into filter $r^2$, the valves $h^{11}$ and $h^8$ being opened. The liquid may now be sent in a reverse direction through filter $r^2$ thus: Before establishing a return-current of liquid from vessel $w$ to filter $r^2$ the valves $h^8\ h^7$ are opened and also that of the head of vessel $p\ h^{17}$ to allow of the escape into the atmosphere of the compressed air contained in filter $r^2$. This done, valve $h^{21}$ on the head of vessel $w$ is opened, when the compressed air will enter vessel $w$ and force the liquid through the pipes $j'$ and $o^5$, valves $h^{15}$ and $h^{11}$ being open, into the filter $r^2$ and fill it, valve $h^8$ having been closed to prevent the liquid rising into the upper filter $r'$. As the filter $r^2$ has been, as before stated, emptied of the compressed air which it contained, there will be no pressure to counterbalance that with which the liquid enters the filter. Once filter $r^2$ is filled with liquid valve $h^{11}$ is closed, and valve $h^{24}$ in the head of vessel $w$ opened to allow the compressed air contained in said vessel to escape. This being done, the valves $h^9\ h^{12}\ h^{15}$ and valve $h^{23}$ are opened, whereupon the air compressed to three atmospheres exerts a pressure upon the liquid contained in filter $r^2$ and forces it into filter $r^3$, in traversing which the liquid deposits the gold held in suspension upon the horizontal slab and then returns through pipes $o^6\ j\ j'$ (the valves $h^{12}$ and $h^{15}$ having been previously opened) to the vessel $w$, which, as has been before stated, has been emptied of compressed air, valve $h^{24}$ being open, there being therefore no pressure at this point to counterbalance that by means of which the liquid is caused to enter vessel $w$.

If preferred, the liquid may be forced from filter $r^2$ into filter $r^3$ and thence into vessel $w$ by admitting (valve $h^{5'}$ being open) compressed air at valve $h^{20}$ on the head of vessel $p$, on opening which (the valves $h^7\ h^8\ h^9\ h^{12}\ h^{15}$ having been first opened and valves $h^{10}\ h^{11}$ closed) the compressed air passing from vessel $p$ into filter $r^2$ will force the liquid which fills filter $r^2$ into filter $r^3$ and thence through pipes $o^6, j$, and $j'$ into vessel $w$, which, it is unnecessary to add, has been emptied of the compressed air by opening valve $h^{24}$. The gold in powder is carried by the liquid on to the upper surface of the horizontal filter-slab, by which it is retained, while the whole of the liquid passes into vessel $w$ through valve $h^{12}$. The covers $r^3$ $r^3$ of the filter $r^2$ are then unbolted and the one cover is swung aside horizontally on its pivot $r$ to allow of the removal of the gold in powder deposited upon the upper surface of the filter-slab. The cover $d^2$ is then opened to allow a portion of the pulverized ore to escape, after which filter $k$ is lowered, and when the filter has arrived in its lowest position the cover $d'$ is opened to allow the whole of the ore which is above the filter to be discharged.

It is to be understood that the entire system of apparatus may be made of any dimensions and that the arrangements and accessory parts may be modified without in any way affecting the principle of the invention.

I claim—

1. The herein-described process for the extraction of gold from its ore, which consists in heating protochlorid of sulfur saturated with chlorin to a temperature of 80°, mixing the pulverized ore with protochlorid of sulfur saturated with the said chlorin at 80° centigrade; subjecting the mass to a temperature of about 130° centigrade so as to dissolve the gold and form a double chlorid of gold and sulfur; filtering and heating the filtrate to about 138° centigrade to decompose the double chlorid of gold and sulfur and obtain the gold in a pulverulent condition the gold being afterward separated from the liquid by a second filtration; substantially as specified.

2. The apparatus for carrying out the herein-described process of extracting gold from its ore, consisting in the combination of an attacking vessel containing a filter; a filter beneath and connected to the attacking vessel through which filter the auriferous solution is filtered; a decomposing vessel connected to the filter in which the filtered auriferous liquid is received; two filters for receiving the products of decomposition from the receiving vessel having cylindrical tubes of porous clay, and a single filter having a porous-stone slab for retaining the gold in powder, the said filters being in communication with the said decomposing vessel; a vessel for containing the protochlorid-of-sulfur filtrate connected to the attacking vessel, a vessel of one-half less capacity connected therewith for containing the protochlorid of sulfur which has been or is to be saturated with chlorin and communicating with the attacking and decomposing vessels; a reservoir of compressed air, and connections connecting the reservoir with the attacking vessel, the filters and the protochlorid-of-sulfur-containing vessel all operating substantially as described to extract gold from its ores, as set forth.

3. In a chlorination apparatus, the combination of a filter, chlorinating-solution-containing vessels, of a hopper-shaped steam-jacketed attacking vessel terminated by a bend at the lower part so as to bring the mouth of the vessel toward one side and provided with a cover having apertures for the introduction of the ore and for the insertion of a thermometer, a cylindrical head provided with valves which separately give passage to the gases, the compressed air and the protochlorid of sulfur saturated with chlorin, said vessel having at its lower part a filter formed of two circular plates with filtering material adapted to be raised and lowered by worm-gear, as described.

The foregoing specification of my process of and apparatus for the extraction of gold from ores signed by me this 24th day of January, 1896.

LOUIS CLÉMENT DAUMAS.

Witnesses:
 CLYDE SHROPSHIRE,
 ALBERT MOREAU.